(12) United States Patent
Nguyen et al.

(10) Patent No.: US 11,062,539 B2
(45) Date of Patent: Jul. 13, 2021

(54) WIRELESS ELECTRONIC LOCKSET USER VALIDATION USING COMPARATIVE GESTURE PROCESSING

(71) Applicant: Spectrum Brands, Inc., Middleton, WI (US)

(72) Inventors: Thuan Duy Nguyen, Mission Viejo, CA (US); James Creighton Hart, Huntington Beach, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

(21) Appl. No.: 16/587,233

(22) Filed: Sep. 30, 2019

(65) Prior Publication Data

US 2020/0105078 A1 Apr. 2, 2020

Related U.S. Application Data

(60) Provisional application No. 62/738,587, filed on Sep. 28, 2018.

(51) Int. Cl.
*G06F 3/01* (2006.01)
*G07C 9/00* (2020.01)
*H04B 17/318* (2015.01)
*G06F 3/0488* (2013.01)

(52) U.S. Cl.
CPC ......... *G07C 9/00309* (2013.01); *G06F 3/017* (2013.01); *G06F 3/0488* (2013.01); *H04B 17/318* (2015.01); *G07C 2009/00769* (2013.01); *G07C 2009/00984* (2013.01)

(58) Field of Classification Search
CPC ...... G07C 9/00309; G07C 2009/00746; G07C 9/00174; G06F 3/017; G06F 3/0488; H04B 17/318
USPC ....................................................... 340/5.61
See application file for complete search history.

(56) References Cited

U.S. PATENT DOCUMENTS

| | | | |
|---|---|---|---|
| 9,424,700 B2 | 8/2016 | Lovett et al. | |
| 2015/0161374 A1* | 6/2015 | Kim | G06F 1/1694 726/19 |
| 2016/0104333 A1* | 4/2016 | Chan | G07C 9/00309 340/5.61 |
| 2016/0217637 A1* | 7/2016 | Gengler | E05B 67/22 |
| 2019/0147157 A1* | 5/2019 | Moorman | H04L 9/0861 713/171 |

* cited by examiner

*Primary Examiner* — Vernal U Brown
(74) *Attorney, Agent, or Firm* — Merchant & Gould P.C.

(57) ABSTRACT

Methods and systems for validating intent to actuate an electronic lock are provided, using comparative gesture processing. One method includes obtaining motion signals representative of physical motion of the mobile device detected by a motion sensor of the mobile device and at an electronic lock. The method includes performing a similarity correlation between the first motion signals and the second motion signals, and, based on the similarity correlation determining that the first motion signals and second motion signals are correlated. Based on the correlation and authentication, the wireless electronic lockset is actuated.

20 Claims, 10 Drawing Sheets

WIRELESS ELECTRONIC LOCKSET USER VALIDATION USING COMPARATIVE GESTURE PROCESSING

CROSS-REFERENCE TO RELATED APPLICATION

This application claims priority to U.S. Provisional Application No. 62/738,587, filed Sep. 28, 2018, which application is hereby incorporated in its entirety.

BACKGROUND

Wireless electronic locksets for residential premises, e.g., at residential exterior doors, are becoming increasingly popular for user convenience. For example, certain types of wireless electronic locksets may await a signal from a mobile device of a user to actuate an unlocking operation at a door. Other types of devices may allow actuation (e.g., unlocking) of the lockset if an authorized mobile device is within proximity of the lockset.

However, these existing wireless electronic locksets have drawbacks with respect to security and convenience. For example, such locksets may have difficulty determining whether a user's mobile device is located at an outside side of a door, rather than inside the residence, for example because location detection may lack accuracy. If the lockset cannot determine whether the mobile device is outside, an unauthorized user may enter a residence simply because the mobile device is in proximity of the door and lockset. To address this problem, complex multi-antenna systems have been developed. However, even in these situations, a user may be outside a premises, but may not intend to unlock the door despite being in proximity to the door. For example, the user may be within wireless range of the door but the door may not be visible to the user. Or, the user may be at the door, but may not wish to unlock the door for some reason. As such, some additional intent to unlock the door may be desirable.

Still further locksets may actuate based on touch of the lockset. Such solutions may utilize a conductive touch surface to detect user activation, and subsequently connect with and authenticate the user based on the presence of the user's mobile device. However, these systems still require complex directional antenna systems. Still further, in cases where it is dark or cold, it may be difficult for the user to correctly touch a correct conductive surface of the wireless lockset for actuation. Accordingly, additional solutions that enhance convenience of a user are sought.

SUMMARY

In summary, the present disclosure relates to an arrangement and methodology for authenticating a user by processing signals captured by a mobile device and a wireless electronic lockset. In particular, a gesture performed by a user with his/her mobile device (e.g., a "knock" or "tap" gesture by the user, with phone in hand) can be captured by sensing circuitry in the mobile device and in the wireless electronic lockset. Comparative similarity of sensed signals at the mobile device and wireless electronic lockset may allow validation of the user and actuation of the wireless electronic lockset.

In a first aspect, a wireless electronic lockset is disclosed. The wireless electronic lockset includes a processing unit, a locking bolt movable between locked and unlocked positions, and a motor actuatable by the processing unit to move the locking bolt between the locked and unlocked positions. The wireless electronic lockset further includes a motion sensor communicatively connected to the processing unit and configured to detect physical motion of the wireless electronic lockset and a wireless interface communicatively connected to the processing unit. The processing unit is configured to execute instructions that cause the lockset to perform receiving, from the motion sensor, first motion signals; and, based on a similarity correlation of the first motion signals to second motion signals captured by the mobile device, actuating the motor to move the locking bolt between the locked and unlocked positions.

In a second aspect, a method of actuating a wireless electronic lockset is disclosed. The method includes receiving first motion signals representative of physical motion of a wireless electronic lockset, and obtaining, at an application installed in a mobile device, second motion signals representative of physical motion of the mobile device detected by a motion sensor of the mobile device. The method includes performing a similarity correlation between the first motion signals and the second motion signals, and, based on the similarity correlation determining that the first motion signals and second motion signals are correlated and authentication of the mobile device at the wireless electronic lockset, transmitting an actuation command to the wireless electronic lockset.

In a third aspect, a system for actuating a wireless electronic lockset is disclosed. The system includes a wireless electronic lockset and an application installable on a mobile device. When the application is executed, it causes the mobile device to capture from a motion sensor of the mobile device, first motion signals, and establish a secure connection to the wireless electronic lockset. The wireless electronic lockset includes a motion sensor and a wireless interface each communicatively connected to a processing unit. The wireless electronic lockset further include a locking bolt movable between locked and unlocked positions and a motor actuatable by the processing unit to move the locking bolt between the locked and unlocked positions. The processing unit of the wireless electronic lockset performs receiving, from the motion sensor, second motion signals, and based on a similarity correlation of the second motion signals to the first motion signals captured by the mobile device, actuating the motor to move the locking bolt between the locked and unlocked positions.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
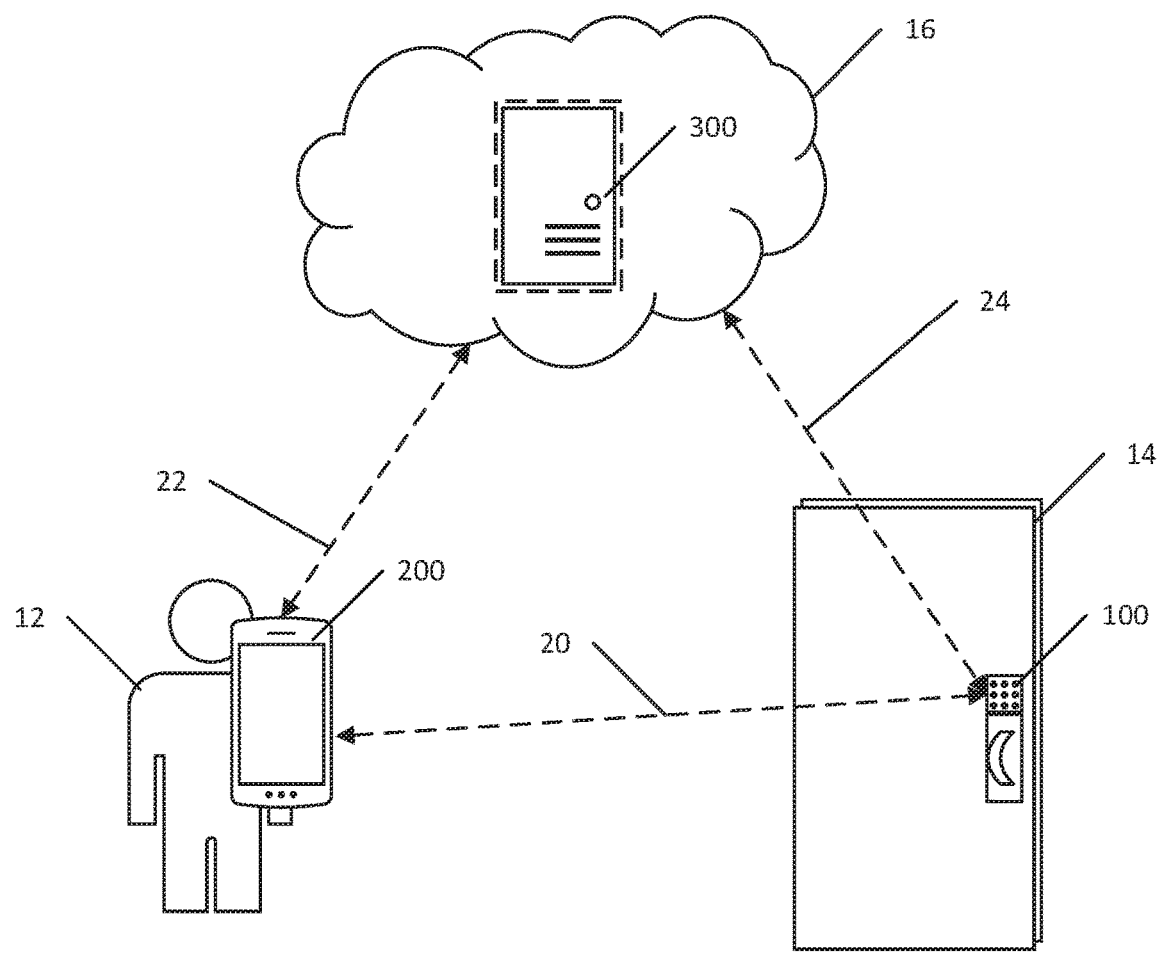
FIG. 1 illustrates an environment in which aspects of the present disclosure may be implemented.

As briefly described above, embodiments of the present invention are directed to comparison of motion signals received at a wireless electronic lockset to motion signals captured by a mobile device. Such comparison can validate that motion taken by the mobile device is a motion intended to cause actuation of the lockset. For example, a knocking action performed by a user holding a mobile device would be reflected as motion signals at the mobile device, and would also reflect a second signal at the electronic lock.

The invention enables a user to tap their electronic door (with internal wireless and sensor capabilities), with their phone or electronic device for the purposes on unlocking/locking the door. The phone or electronic device would store the tapping (knock) behavior provided by internal sensors, and the door or lock would store the same tapping (knock) behavior, triggering the phone to initiate a wireless connection with the lock. The phone would retrieve the locks last tapping (knock) event information and begin the comparison process. Using properties specific to the users knock, a comparison will be made between the phones and the locks tapping information to determine if the user intended on locking or unlocking the door. If the established set of criteria is met then the phone or device would issue a command using a pre-established secure and authenticated connection provided by the phone or electronic device. This command would result in the door unlocking or locking for the user and the status reporting back to the phone or electronic device.

The term "lock" or "lockset" is broadly intended to include any type of lock, including but not limited to deadbolts, knob locks, lever handle locks, mortise locks and slide locks, whether mechanical, electrical or electro-mechanical locks. The locking points may have various mounting configurations and/or locations, including but not limited to: mortised within the doorframe, mounted externally to the doorframe or support structure, and/or affixed directly to the door.

The interconnected system may have an unlimited number of locking points. In one embodiment, for example, a first lock may wirelessly communicate with a plurality of interconnected locks so that actuation of the first lock also actuates one or more of the other interconnected locks. For example, the plurality of interconnected locks may have a wireless communication feature that allows communication between locks. By way of example only, the wireless communication capability of the locks could use the Bluetooth wireless connection noted above, or in alternative embodiments, could also use the IEEE 802.11 standard, such as using Wi-Fi, or the IEEE 802.15.4 standard, such as using Zigbee, a cellular network, a wireless local area network, near-field communication protocol, or any other network protocols. Accordingly, the locks could communicate directly with a mobile device, or use a wireless gateway, and/or coordinate with other networking devices.

Although this disclosure describes these features as implemented on a deadbolt for purposes of example, these features are applicable to any type of lockset, including but not limited to deadbolts, knobset locks, handleset locks, etc.

FIG. 1 illustrates an environment 10 in which aspects of the present disclosure may be implemented. A user 12 has a phone or other mobile device 200 with wireless communication capabilities. The user 12 is an authorized person desiring to unlock (or lock) a door 14. The door 14 includes a wireless electronic lockset 100. The mobile device 200 is capable of communicating 22 with a key server 300 and communicating 20 with the wireless electronic lockset 100. The key server 300 can be, for example a physical server, or a virtual server hosted in a cloud storage environment 16. The wireless electronic lockset 100 is also capable of communicating 24 with the key server 300. Such communication can optionally occur via one or more wireless communication protocols, e.g., Wi-Fi (IEEE 802.11), short-range wireless, etc. The key server 300 stores the value (or key) used to authenticate the mobile device 200 when attempting to unlock the door 14. Of course, in alternative embodiments, authentication between the wireless electronic lockset 100 and the mobile device 200 can be performed independently of a key server.

Figure 2:
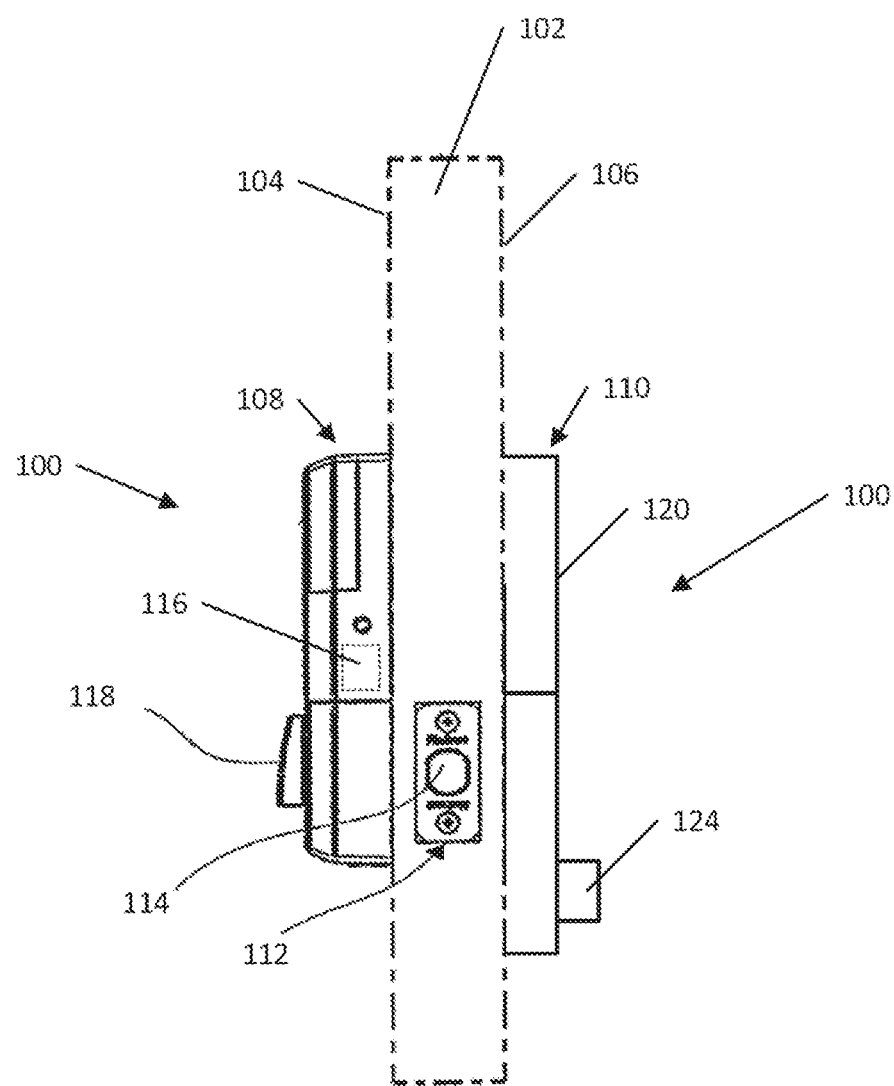
FIG. 2 illustrates a rear perspective view of a portion of the electronic lock of FIG. 1.
Figure 3:
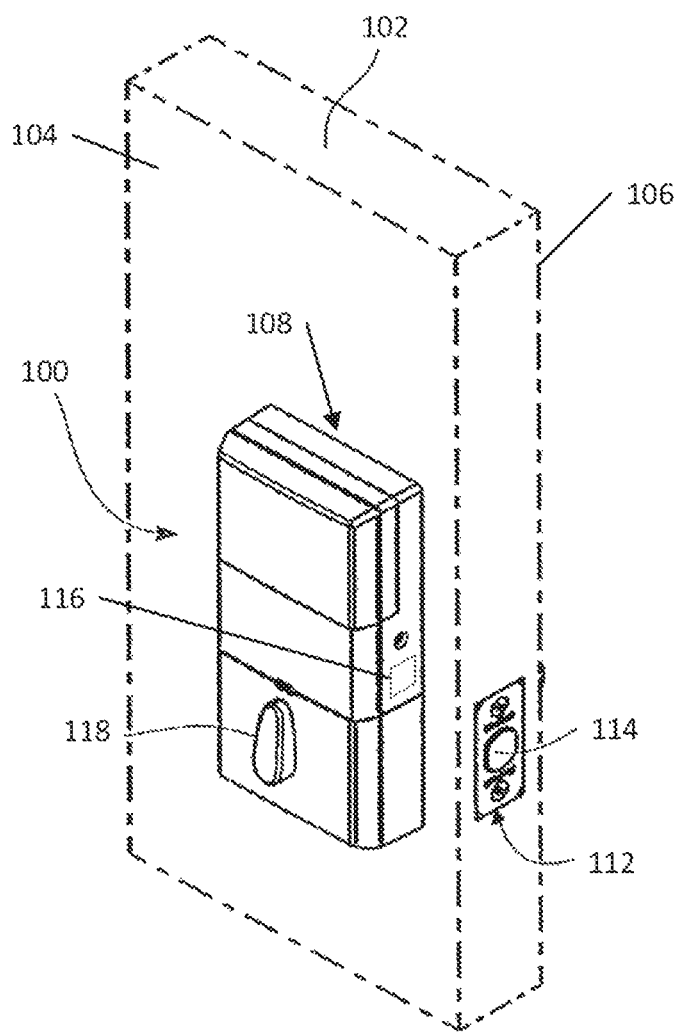
FIG. 3 illustrates a front perspective view of a portion of the electronic lock of FIG. 1.
Figure 4:
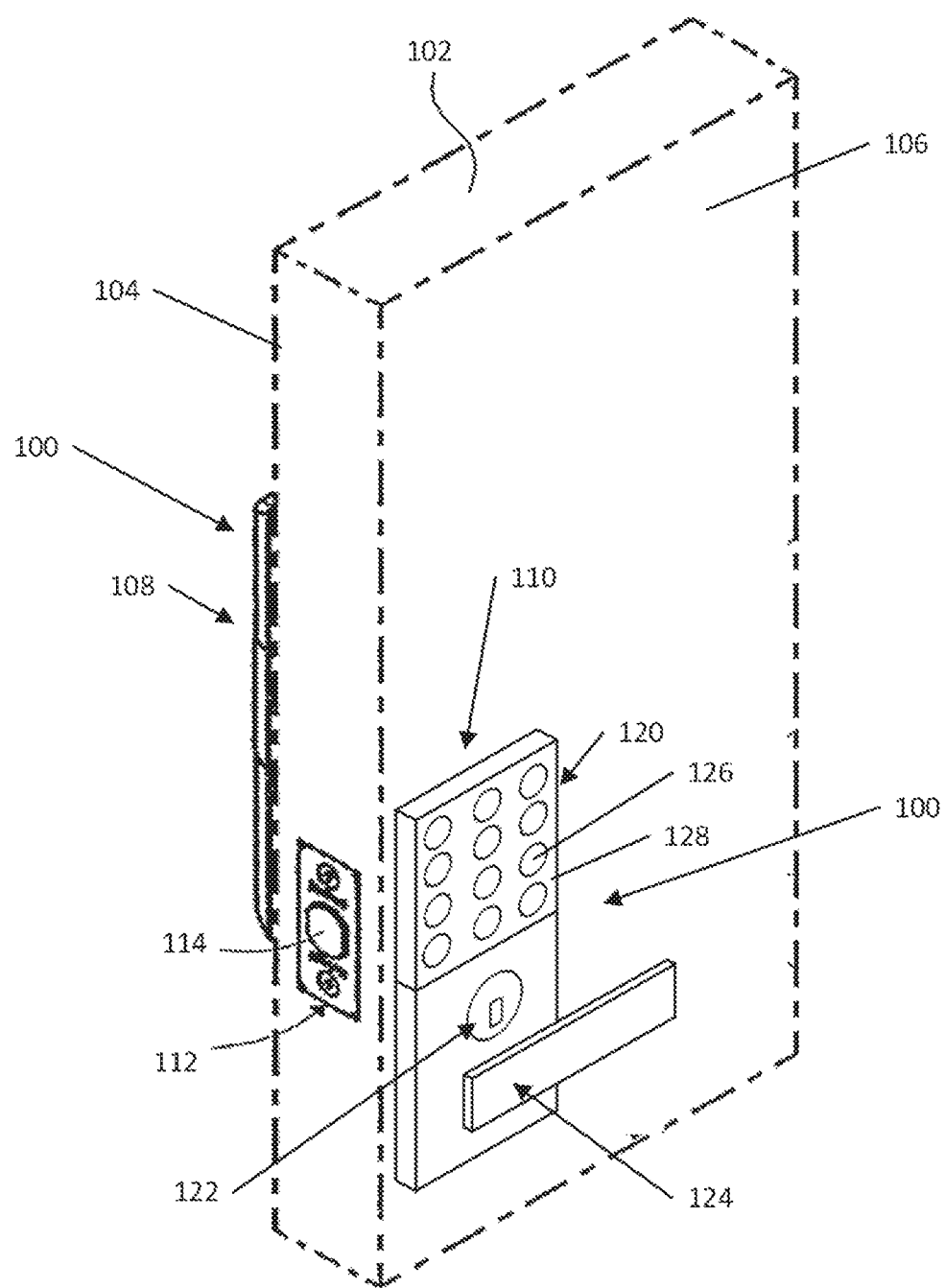
FIG. 4 illustrates a schematic representation of an example system utilizing the electronic lock of FIG. 1.

FIGS. 2-4 illustrate an electronic lock 100 (also referred to herein as a "wireless electronic lockset") mounted to a door 102, according to one example of the present disclosure. The door has an interior side 104 and an exterior side 106. The electronic lock 100 includes an interior assembly 108, an exterior assembly 110, and a latch assembly 112. The latch assembly 112 is shown to include a bolt 114 that is movable between an extended position (locked) and a retracted position (unlocked, shown in FIGS. 2-4). Specifically, the bolt 114 is configured to slide longitudinally and, when the bolt 114 is retracted, the door 102 is in an unlocked state. When the bolt 114 is extended, the bolt 114 protrudes from the door 102 into a door jamb (not shown) to place the door in a locked state.

In some examples, the interior assembly 108 is mounted to the interior side 104 of the door 102, and the exterior assembly 110 is mounted to the exterior side 106 of the door 102. The latch assembly 112 is typically at least partially mounted in a bore formed in the door 102. The term "outside" is broadly used to mean an area outside the door 102 and "inside" is also broadly used to denote an area inside the door 102. With an exterior entry door, for example, the exterior assembly 110 may be mounted outside a building, while the interior assembly 108 may be mounted inside a building. With an interior door, the exterior assembly 110 may be mounted inside a building, but outside a room secured by the lock 100, and the interior assembly 108 may be mounted inside the secured room. The lock 100 is applicable to both interior and exterior doors.

Referring to FIG. 3, the interior assembly 108 can include a processing unit 116 (shown schematically) containing electronic circuitry for the electronic lock 100. In some examples, the interior assembly 108 includes a manual turnpiece 118 that can be used on the interior side 104 of door 102 to move the bolt 114 between the extended and retracted positions.

The processing unit 116 is operable to execute a plurality of software instructions (i.e., firmware) that, when executed by the processing unit 116, cause the electronic lock 100 to implement the methods and otherwise operate and have functionality as described herein. The processing unit 116 may comprise a device commonly referred to as a processor, e.g., a central processing unit (CPU), digital signal processor (DSP), or other similar device and may be embodied as a standalone unit or as a device shared with components of the electronic lock 100. The processing unit 116 may include memory communicatively interfaced to the processor, for storing the software instructions. Alternatively, or the electronic lock 100 may further comprise a separate memory device for storing the software instructions that is electrically connected to the processing unit 116 for the bi-directional communication of the instructions, data, and signals therebetween.

Referring to FIG. 4, the exterior assembly 110 can include exterior circuitry communicatively and electrically connected to the processing unit 116. For example, the exterior assembly 110 can include a keypad 120 for receiving a user input and/or a keyway 122 for receiving a key (not shown). The exterior side 106 of the door 102 can also include a handle 124. In some examples, the exterior assembly 110 includes the keypad 120 and not the keyway 122. In some examples, the exterior assembly 110 includes the keyway 122 and not the keypad 120. In some examples, the exterior assembly 110 includes the keyway 122 and the keypad 120. When a valid key is inserted into the keyway 122, the valid key can move the bolt 114 between the extended and retracted positions. When a user inputs a valid code into the keypad 120, the bolt 114 is moved between the extended and retracted positions.

In some examples, the exterior assembly 110 is electrically connected to the interior assembly 108. Specifically, the keypad 120 is electrically connected to the interior assembly 108, specifically to the processing unit 116, by, for example, an electrical cable (not shown) that passes through the door 102. When the user inputs a valid code via keypad 120 that is recognized by the processing unit 116, an electrical motor is energized to retract the bolt 114 of latch assembly 112, thus permitting door 102 to be opened from a closed position. Still further, an electrical connection between the exterior assembly 110 and the interior assembly 108 allows the processing unit 116 to communicate with other features included in the exterior assembly 110, as noted below The keypad 120 can be any of a variety of different types of keypads. The keypad 120 can be one of a numeric keypad, an alpha keypad, and/or an alphanumeric keypad. The keypad 120 can have a plurality of characters 126 displayed thereon. For example, the keypad 120 can include a plurality of buttons that can be mechanically actuated by the user (e.g., physically pressed). In some examples, the keypad 120 includes a touch interface 128, such as a touch screen or a touch keypad, for receiving a user input. The touch interface 128 is configured to detect a user's "press of a button" by contact without the need for pressure or mechanical actuation. An example of the touch interface is described in U.S. Pat. No. 9,424,700, which is hereby incorporated by reference in its entirety.

Figure 5:
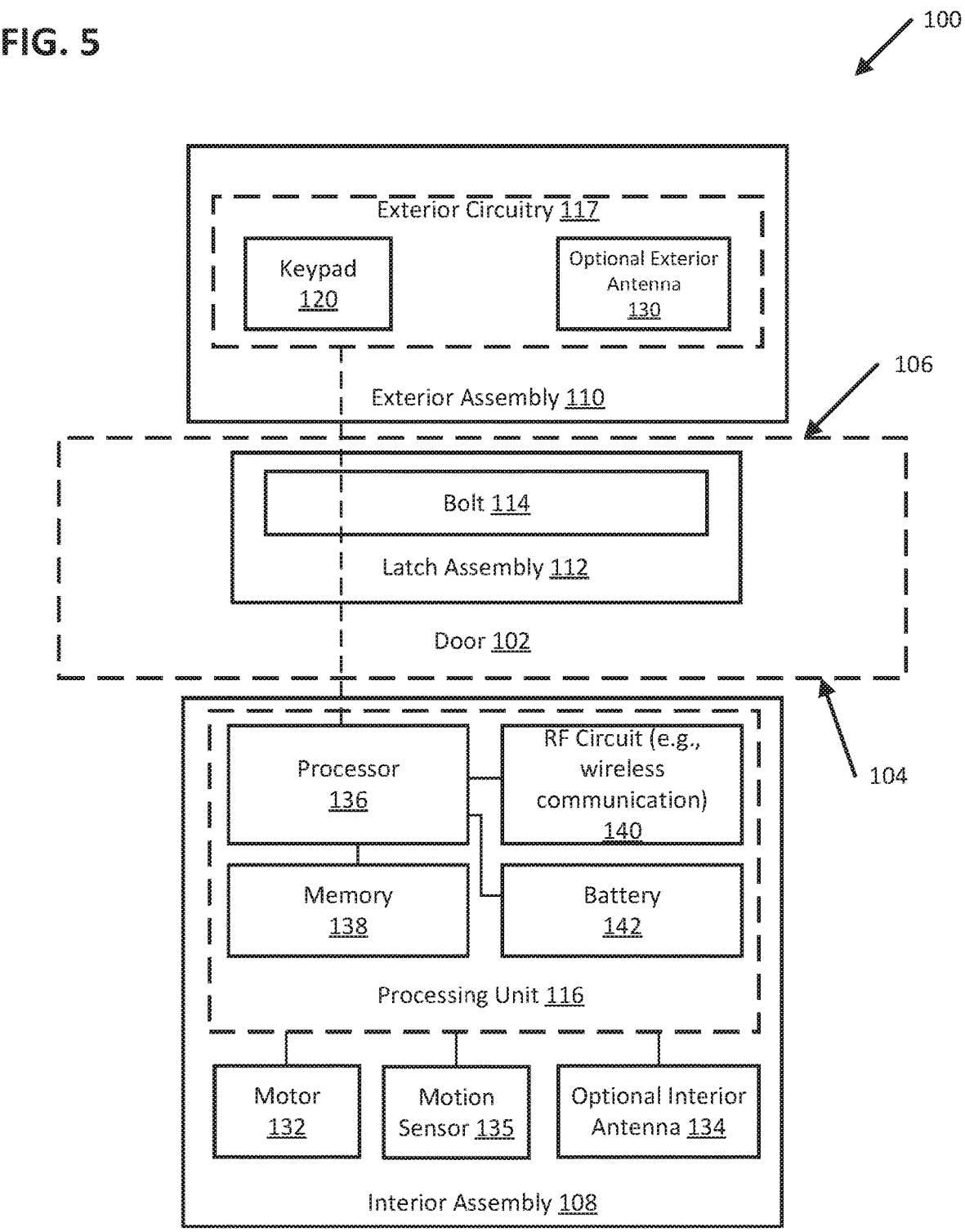
FIG. 5 illustrates a schematic representation of the electronic lock of FIG. 1.

FIG. 5 is a schematic representation of the electronic lock 100 mounted to the door 102. The interior assembly 108, the exterior assembly 110, and the latch assembly 112 are shown.

The exterior assembly 110 is shown to include the keypad 120 and an optional exterior antenna 130 usable for communication with a remote device.

The exterior antenna 130 is capable of being used in conjunction with an interior antenna 134, such that the processing unit 116 can determine where a mobile device is located. Only a mobile device 200 determined to be located on the exterior of the door is able to actuate (unlock or lock) the door. This prevents unauthorized users from being located exterior to the door 102 of the electronic lock and taking advantage of an authorized mobile device that may be located on the interior of the door, even though that authorized mobile device is not being used to actuate the door. However, such a feature is not required, but can add additional security.

As described above, the interior assembly 108 includes the processing unit 116. The interior assembly 108 can also include a motor 132 and an optional interior antenna 134.

As shown, the processing unit 116 includes a processor 136 communicatively connected to memory 138, an RF circuit 140, and a battery 142. The processing unit 116 is located within the interior assembly 108 and is capable of operating the electronic lock 100, e.g., by actuating a motor 132 to actuate the bolt 114.

In some examples, the processor 136 can process signals received from a variety of devices to determine whether the electronic lock 100 should be actuated. Such processing can be based on a set of preprogrammed instructions (i.e., firmware) stored in the memory 138. In some examples, the processing unit 116 is configured to capture a keypad input event from a user and store the keypad input event in the memory 138. In other examples, the processor 136 receives a signal from the exterior antenna 130, interior antenna 134, or motion sensor 135 (e.g., a vibration sensor, gyroscope, accelerometer, motion/position sensor, or combination thereof) and can validate received signals in order to actuate the lock 100. In a particular embodiment, the processor 136 will receive a signal at the RF circuit 140 via a wireless communication protocol from a mobile device 200, which uses a protocol different from that communication protocol to receive a value from the electronic lock 100 for authentication.

In example embodiments, the motion sensor 135 can be used in conjunction with the processing unit 116 to cooperatively determine, with mobile device 200, that a user has an intent to actuate the electronic lock, e.g., by detecting corresponding motion signals between such devices. Using such a motion sensor (e.g., an accelerometer, gyroscope, or other position or motion sensor) and wireless capabilities of a mobile device or an electronic device (i.e. fob, smartwatch, or other wearable or Internet of Things device) with these capabilities embedded inside can assist in determining additional types of events (e.g., a door opening or door closing event, a lock actuation or lock position event, or a knock event based on vibration of the door). In some cases, motion events can cause the electronic lock 100 to perform certain processing, e.g., to communicatively connect to or transmit data to a mobile device 200 in proximity to the electronic lock 100. An example implementation of such an arrangement is provided below in connection with FIGS. 7-8.

The memory 138 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically erasable programmable ROM, and other types of devices and/or articles of manufacture that store data. Computer storage media generally includes at least one or more tangible media or devices. Computer storage media can, in some examples, include embodiments including entirely non-transitory components.

In some examples, the processing unit 116 can include the RF circuit 140. The RF circuit 140 is capable of providing at least one wireless communication protocol. In some examples, the processing unit 116 can communicate with a remote device via the RF circuit 140. In some examples, the processing unit 116 can communicate with one or both of the mobile device 200 and key server 300 via the RF circuit 140. The RF circuit 140 can include one or more wireless communication interfaces, e.g., Bluetooth, Wi-Fi (IEEE 802.11x protocols), or any other wireless communication interface capable of bidirectional wireless communication. In example embodiments, the RF circuit 140 can include a Bluetooth Low Energy (BLE) interface.

In some examples, the electronic lock 100 can wirelessly communicate with external devices through a desired wireless communications protocol. In some examples, an external device can wirelessly control the operation of the electronic lock 100, such as operation of the bolt 114. The electronic lock 100 can utilize wireless protocols including, but not limited to, the IEEE 802.11 standard (Wi-Fi), the IEEE 802.15.4 standard (Zigbee and Z-wave), the IEEE 802.15.1 standard (Bluetooth®), a cellular network, a wireless local area network, near-field communication protocol, and/or other network protocols. In some examples, the electronic lock 100 can wirelessly communicate with networked and/or distributed computing systems, such as may be present in a cloud-computing environment. Such communication may be facilitated, e.g., by the RF circuit 140.

The interior assembly 108 also includes the battery 142 to power the electronic lock 100. In one example, the battery 142 may be a standard single-use (disposable) battery. Alternatively, the battery 142 may be rechargeable. In still further embodiments, the interior assembly 108 can lack the battery 142 entirely, but instead be electrically connected to an external power source.

The interior assembly 108 also includes the motor 132 that is capable of actuating the bolt 114. In use, the motor 132 receives an actuation command from the processing unit 116, which causes the motor 132 to actuate the bolt 114 from the locked position to the unlocked position or from the unlocked position to the locked position. In some examples, the motor 132 actuates the bolt 114 to an opposing state. In some examples, the motor 132 receives a specified lock or unlock command, where the motor 132 only actuates the bolt 114 if the bolt 114 is in the correct position. For example, if the door 102 is locked and the motor 132 receives a lock command, then no action is taken. If the door 102 is locked and the motor 132 receives an unlock command, then the motor 132 actuates the bolt 114 to unlock the door 102.

As noted above, the optional interior antenna 134 may also be located in the interior assembly 108. In some examples, the interior antenna 134 is capable of operating together with the exterior antenna 130 to determine the location of the mobile device 208. In some examples, only a mobile device determined to be located on the exterior side 110 of the door 102 is able to unlock (or lock) the door 102. This prevents unauthorized users from being located near the electronic lock 100 and taking advantage of an authorized mobile device that may be located on the interior side 108 of the door 102, even though the authorized mobile device is not being used to unlock the door 102.

Referring to FIGS. 2-5 generally, in example embodiments, the electronic lock 100 may be used on both interior and exterior doors. Described below are non-limiting examples of a wireless electronic lockset. It should be noted that the electronic lock 100 may be used on other types of doors, such as a garage door or a doggie door, or other types of doors that require an authentication process to unlock (or lock) the door.

In some embodiments, the electronic lock 100 is made of mixed metals and plastic, with engineered cavities to contain electronics and antennas. For example, in some embodiments, the lock utilizes an antenna near the exterior face of the lockset, designed inside the metal body of the lockset itself. The metal body can be engineered to meet strict physical security requirements and also allow an embedded front-facing antenna to propagate RF energy efficiently.

Figure 6A:
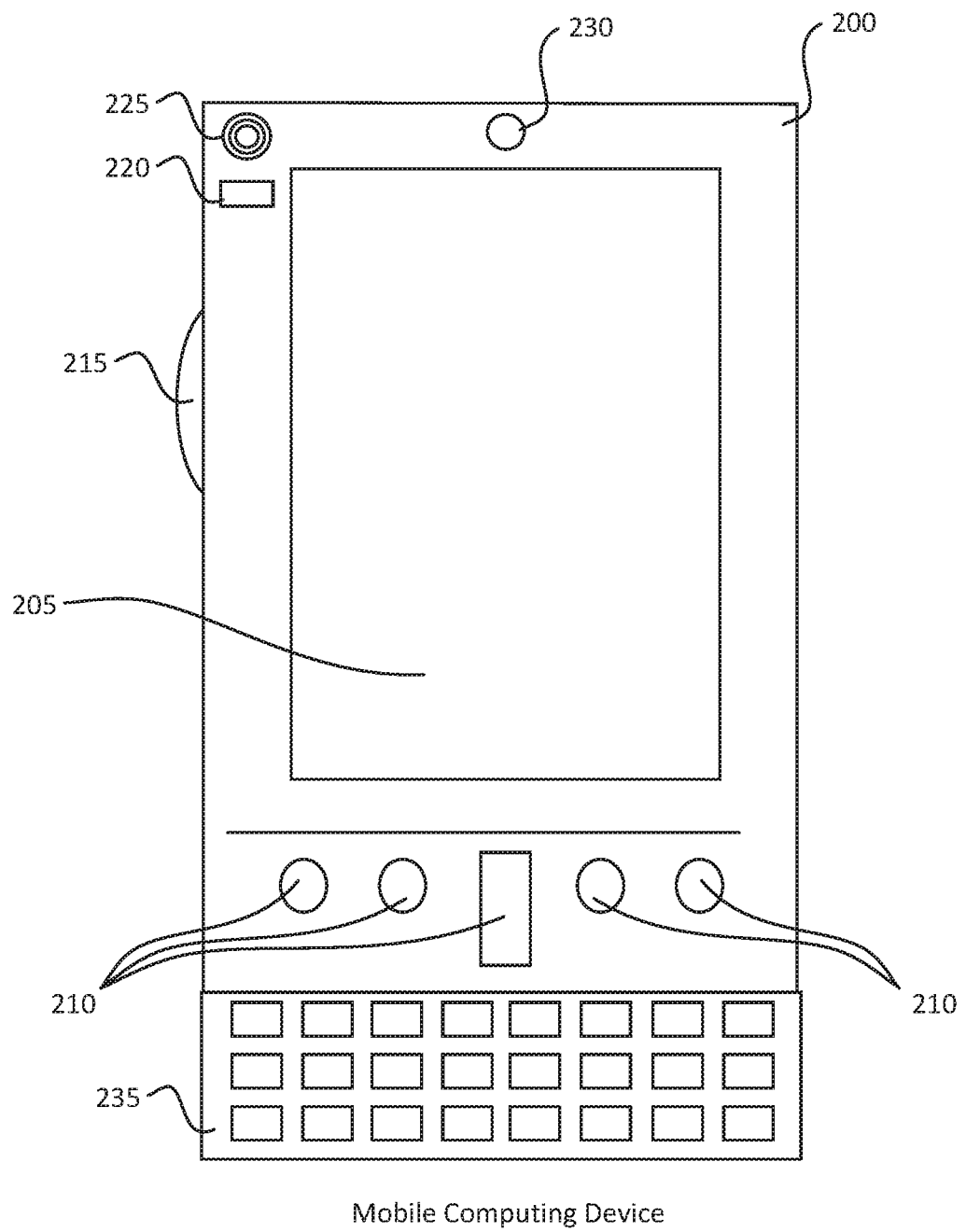
FIGS. 6A and 6B are simplified block diagrams of a mobile device with which embodiments of the present invention may be practiced.
Figure 6B:
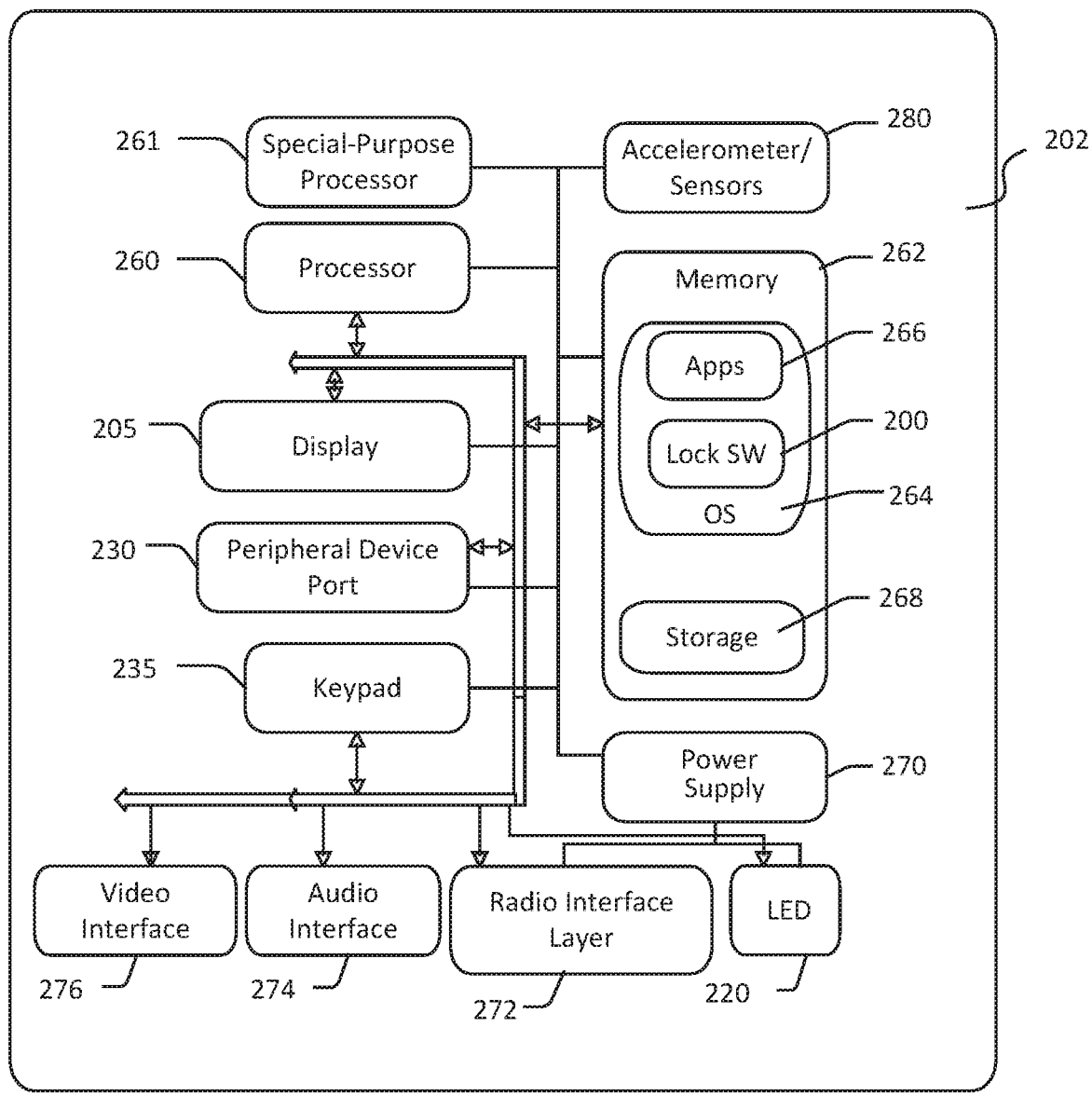

FIGS. 6A and 6B illustrate a mobile device 200, for example, a mobile telephone, a smart phone, wearable computer (such as a smart watch), a tablet computer, a laptop computer, and the like, with which embodiments of the disclosure may be practiced. With reference to FIG. 6A, one aspect of a mobile device 200 for implementing the aspects is illustrated. The mobile device 200 typically includes a display 205 and one or more input buttons 210 that allow the user to enter information into the mobile computing device 200. In various embodiments, the output elements include the display 205 for showing a graphical user interface (GUI), a visual indicator 220 (e.g., a light emitting diode), and/or an audio transducer 225 (e.g., a speaker). In an aspect, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIGS. 6A and 6B illustrate a mobile computing device 200, for example, a mobile telephone, a smart phone, a tablet personal computer, a laptop computer, and the like, with which embodiments of the invention may be practiced. With reference to FIG. 6A, one embodiment of a mobile computing device 200 for implementing the embodiments is illustrated. In a basic configuration, the mobile computing device 200 is a handheld computer having both input elements and output elements. The mobile computing device 200 typically includes a display 205 and one or more input buttons 210 that allow the user to enter information into the mobile computing device 200. The display 205 of the mobile computing device 200 may also function as an input device (e.g., a touch screen display). If included, an optional side input element 215 allows further user input. The side input element 215 may be a rotary switch, a button, or any other type of manual input element. In alternative embodiments, mobile computing device 200 may incorporate more or less input elements. For example, the display 205 may not be a touch screen in some embodiments. In yet another alternative embodiment, the mobile computing device 200 is a portable phone system, such as a cellular phone. The mobile computing device 200 may also include an optional keypad 235. Optional keypad 235 may be a physical keypad or a "soft" keypad generated on the touch screen display. In various embodiments, the output elements include the display 205 for showing a graphical user interface (GUI), a visual indicator 220 (e.g., a light emitting diode), and/or an audio transducer 225 (e.g., a speaker). In some embodiments, the mobile computing device 200 incorporates a vibration transducer for providing the user with tactile feedback. In yet another embodiment, the mobile computing device 200 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 200 can incorporate a system (i.e., an architecture) 202 to implement some embodiments. In one embodiment, the system 202 is implemented as a "smart phone" capable of running one or more applications (e.g., browser, e-mail, calendaring, contact managers, messaging clients, games, and media clients/players). In some embodiments, the system 202 is integrated as a computing device, such as an integrated personal digital assistant (PDA) and wireless phone.

One or more application programs 266 may be loaded into the memory 262 and run on or in association with the operating system 264. Examples of the application programs include phone dialer programs, e-mail programs, personal information management (PIM) programs, word processing programs, spreadsheet programs, Internet browser programs, messaging programs, and so forth. The system 202 also includes a non-volatile storage area 268 within the memory 262. The non-volatile storage area 268 may be used to store persistent information that should not be lost if the system 202 is powered down. The application programs 266 may use and store information in the non-volatile storage area 268.

As should be appreciated, various applications may be loaded into the memory 262 and run on the mobile computing device 200, including a wireless lock control application, operation of which is described herein.

The system 202 has a power supply 270, which may be implemented as one or more batteries. The power supply 270 might further include an external power source, such as an AC adapter or a powered docking cradle that supplements or recharges the batteries.

The system 202 may also include a radio 272 that performs the function of transmitting and receiving radio frequency communications. The radio 272 facilitates wireless connectivity between the system 202 and the "outside world," via a communications carrier or service provider. Transmissions to and from the radio 272 are conducted under control of the operating system 264. In other words, communications received by the radio 272 may be disseminated to the application programs 266 via the operating system 264, and vice versa. Radio 272 can be implemented using one or more wireless communication frequencies and/or protocols, as outlined above in connection with FIGS. 1-8. In certain embodiments, Radio 272 represents a plurality of wireless radio interfaces useable for data communications.

The visual indicator 220 may be used to provide visual notifications, and/or an audio interface 274 may be used for producing audible notifications via the audio transducer 225. In the illustrated embodiment, the visual indicator 220 is a light emitting diode (LED) and the audio transducer 225 is a speaker. These devices may be directly coupled to the power supply 270 so that when activated, they remain on for a duration dictated by the notification mechanism even though the processor 260 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 225, the audio interface 274 may also be coupled to a microphone to receive audible input, such as to facilitate a telephone conversation. In accordance with embodiments of the present invention, the microphone may also serve as an audio sensor to facilitate control of notifications, as will be described below. The system 202 may further include a video interface 276 that enables an operation of an on-board camera 230 to record still images, video stream, and the like.

A mobile computing device 200 implementing the system 202 may have additional features or functionality. For example, the mobile computing device 200 may also include additional data storage devices (removable and/or non-removable) such as, magnetic disks, optical disks, or tape. Such additional storage is illustrated in FIG. 6B by the non-volatile storage area 268. Additionally, and in accordance with some example embodiments, the mobile computing device 200 can include a wireless tag reader. Such a wireless tag reader can be represented via radio 272, above, and can be one of a plurality of wireless communication interfaces present within the mobile computing device 200.

Data/information generated or captured by the mobile computing device 200 and stored via the system 202 may be stored locally on the mobile computing device 200, as described above, or the data may be stored on any number of storage media that may be accessed by the device via the radio 272 or via a wired connection between the mobile computing device 200 and a separate computing device associated with the mobile computing device 200, for example, a server computer in a distributed computing network, such as the Internet. As should be appreciated such data/information may be accessed via the mobile computing device 200 via the radio 272 or via a distributed computing network. Similarly, such data/information may be readily transferred between computing devices for storage and use according to well-known data/information transfer and storage means, including electronic mail and collaborative data/information sharing systems.

As should be appreciated, FIGS. 6A and 6B are described for purposes of illustrating the present methods and systems and is not intended to limit the disclosure to a particular sequence of steps or a particular combination of hardware or software components.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The term computer readable media as used herein may include computer storage media. Computer storage media may include volatile and nonvolatile, removable and non-removable media implemented in any method or technology for storage of information, such as computer readable instructions, data structures, or program modules. The system memory 204, the removable storage device 209, and the non-removable storage device 210 are all computer storage media examples (i.e., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 200. Any such computer storage media may be part of the computing device 200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
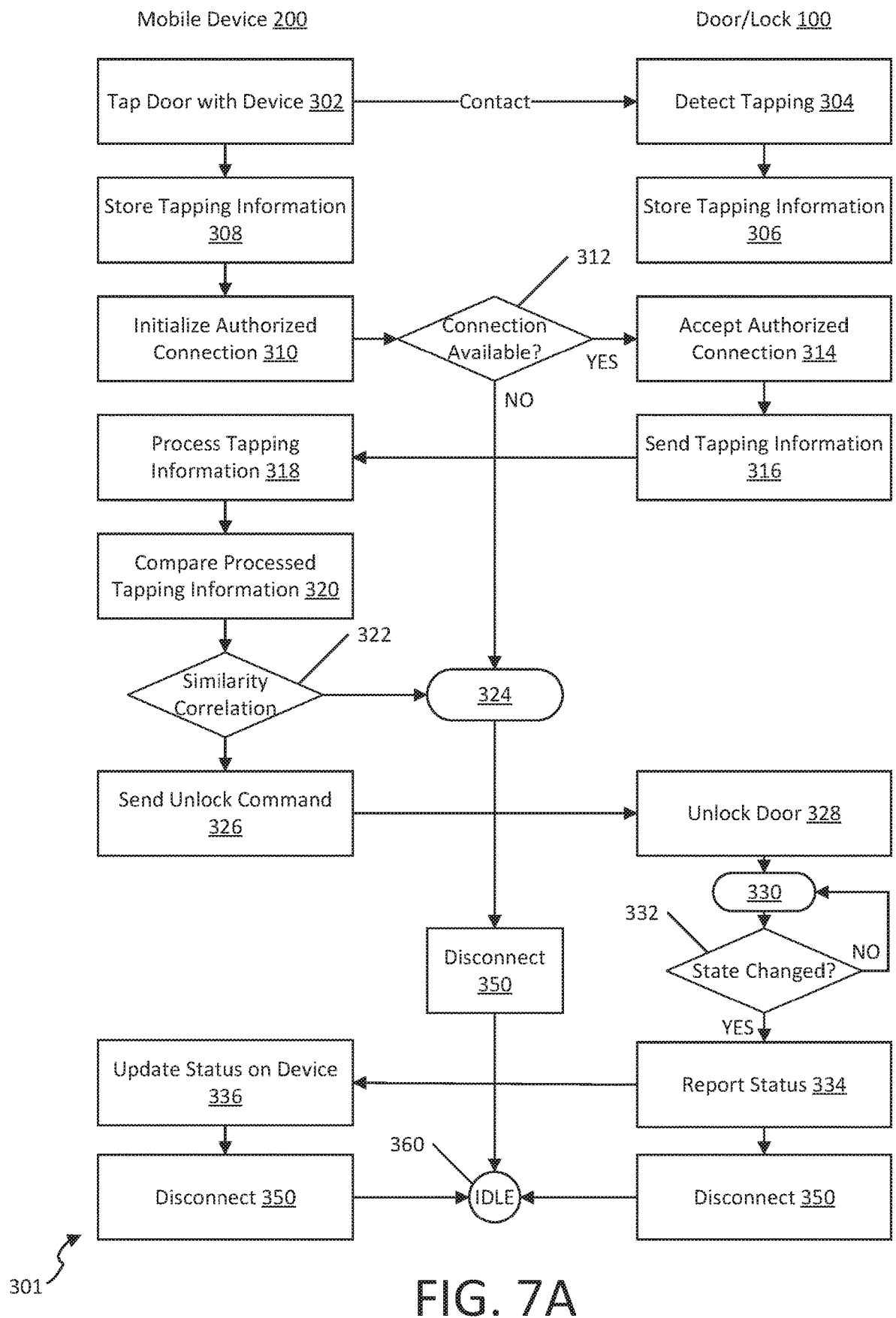
FIG. 7A is a flowchart of a method of validating a user performed using a mobile device and a wireless electronic lockset, according to an example embodiment.
Figure 7B:
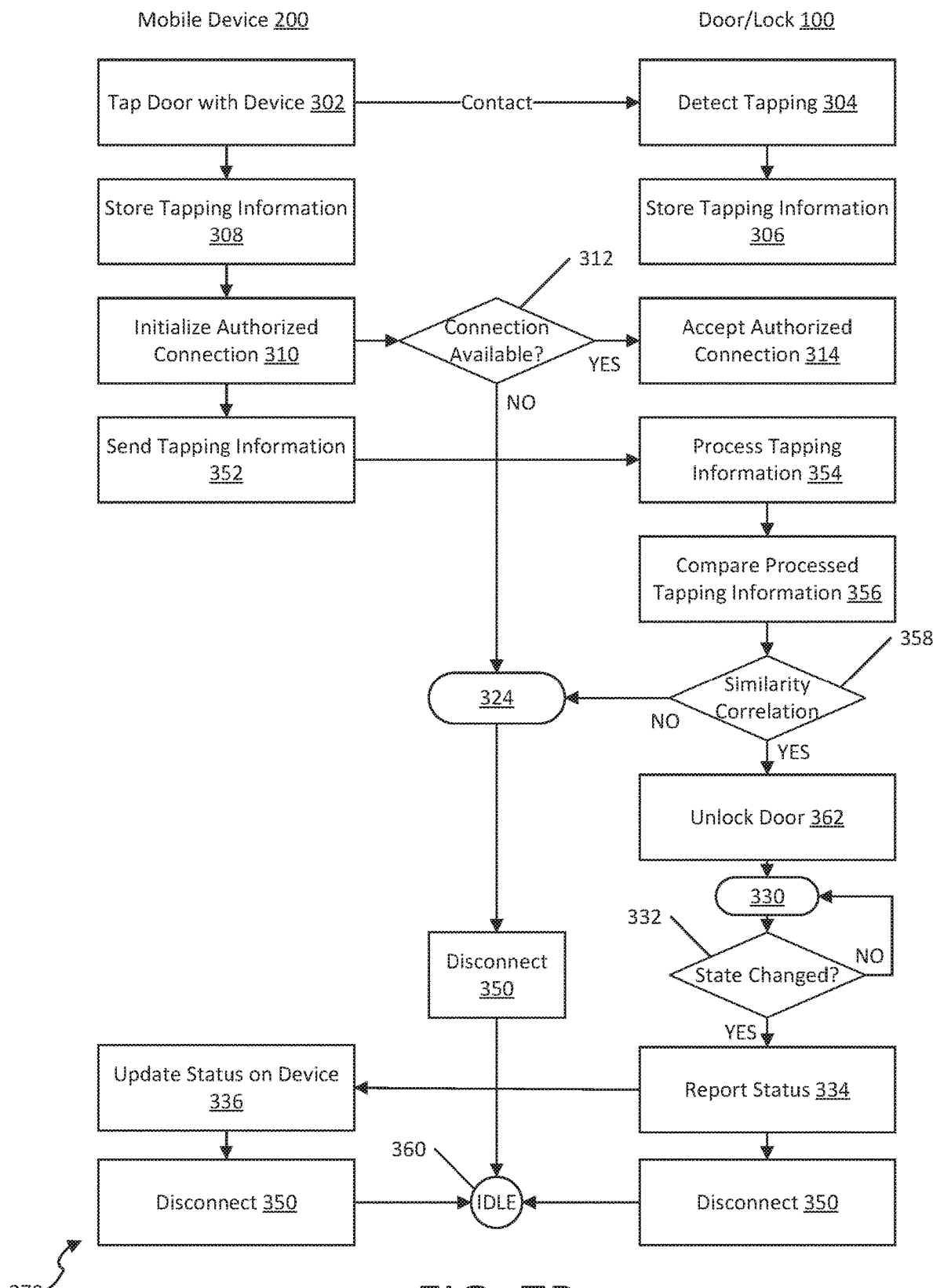
FIG. 7B is a flowchart of a method of validating a user performed using a mobile device and a wireless electronic lockset, according to an example alternative embodiment.
Figure 8:
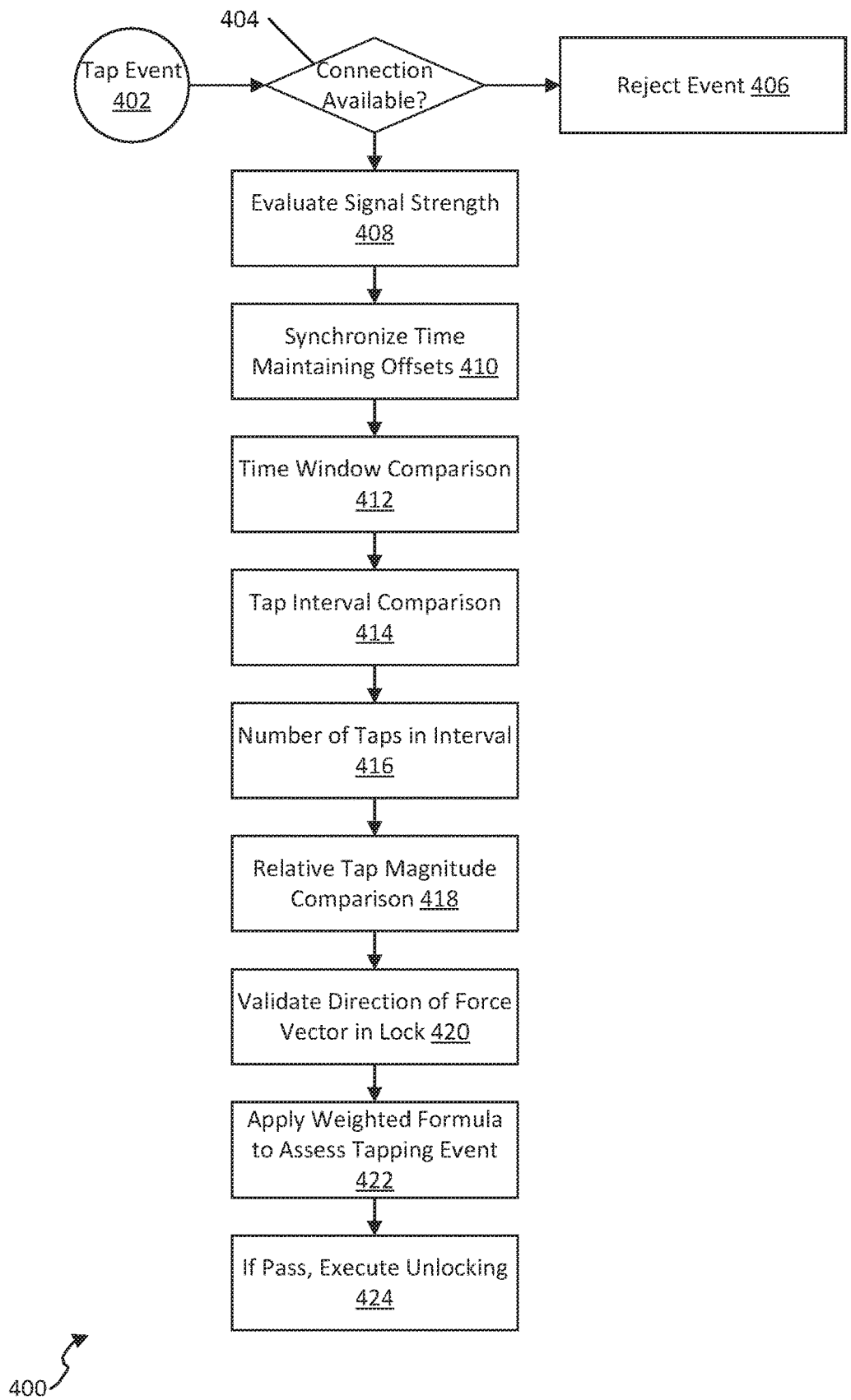
FIG. 8 is a flowchart of a method of comparing gesture processing signals via a mobile device, according to an example embodiment.

Referring now to FIGS. 7A-7B and 8, methods of actuating an electronic lock 100 by cooperative signal processing by the electronic lock and a mobile device 200 are shown. An example electronic lock useable to perform the methods described herein is described above in connection with FIGS. 2-5, and the mobile device shown in connection with FIGS. 6A-6B. Regarding FIGS. 7A-7B and 8, it is noted that although discussed in connection with a mobile device communicating with the electronic lock 100, other arrangements may be possible in which a fob or other electronic device is used in place of a mobile device.

Referring first to FIG. 7A, a method 301 of validating a user performed using a mobile device and a wireless electronic lockset, according to an example embodiment. Generally, method 700 of FIG. 7A provides for actuating an electronic lock 100 by way of correspondence between detected motion signals at the mobile device 200 and electronic lock 100, as determined at the mobile device. In the example shown, a user who has mobile device 200 in his/her possession will perform a gesture-based operation with the mobile device 200 that causes some type of corresponding motion by the electronic lock 100. For example, the user of the mobile device 200 could tap the mobile device against the door 102 in a "knocking" or "tapping" action (step 302). This will cause the motion sensor integrated in the mobile device 200 to detect a distinctive motion pattern, and will also cause slight movement of the door concurrently with the mobile device making contact with the door. A corresponding motion sensor in the electronic lock 100 (e.g., motion sensor 135) can capture a similar motion signal upon detection of, e.g., a tapping operation (step 304). The electronic lock 100 will then store the tapping information in memory of the electronic lock (step 306). Similarly, the mobile device 200 will store tapping information captured by the motion sensor of the mobile device (step 308). Capture of the tapping or knocking action at the electronic lock 100 and the mobile device 200 may be performed with respect to, e.g., an action in the mobile device (movement of the device) and corresponding movement of a door against which the mobile device is tapping or contacting (to which the electronic lock 100 is mounted), and therefore the tapping information will represent approximately simultaneous, or at least partially concurrent, motion or gesture information that is captured at the respective devices.

The tapping information can include various types of information useable to determine a tapping "signature" from the user's gesture. This can include, for example, a timestamp of the tapping operation captured at each device; a magnitude of each detected tapping operation, and/or times between successive tapping operations; relative magnitudes between successive tapping operations; or other types of tapping effects.

The mobile device will initiate an authorized connection with the lock 100 (step 310). If a connection is available (operation 312), the lock 100 will accept an authorized connection (step 314). This can be performed via any of a number of communication mechanisms, e.g., Bluetooth, Wi-Fi, or other communication means. If connection is not available, a connection is denied at 324, and the mobile device 200 and electronic lock disconnect (step 350), entering an idle state 360.

Once the connection is established, the electronic lock 100 will send tapping information to the mobile device 200 (step 316). The mobile device 200 will process the tapping information (step 318) to determine features of the tapping information obtained in steps 308, 310. A comparison of the processed tapping information is performed (step 320) and a similarity correlation established (step 322). The comparison in tapping information can be performed to determine characteristics such as frequency, magnitude, or relative signatures in tapping information. The similarity correlation determines whether, within a particular threshold, processed tapping information at the mobile device 200 corresponds to that at the electronic lock 100; if there is no adequate correlation, at 324, connection is denied and the devices disconnect (step 350), returning to an idle state 360. The determination of correlation can be performed, for example as discussed below in connection with FIG. 8.

If the similarity correlation determines that there is adequate correspondence between processed tapping information sets, the mobile device 200 sends an unlock command to the electronic lock 100 (step 326) and the electronic lock 100 actuates to unlock the door (step 328) in response. At step 330, the door status is assessed, and a state change operation 332 assess whether the door has unlocked successfully. Upon completion of unlocking, a status is reported by the electronic lock 100 to the mobile device (step 334). The mobile device 200 updates its status (step 336) and the electronic lock and mobile device disconnect (step 350), and subsequently enter an idle state 360.

FIG. 7B is a flowchart of a method 370 of validating a user performed using a mobile device and a wireless electronic lockset, according to an example alternative embodiment. In this example, the comparison of tapping information occurs on the electronic lock 100 rather than on the mobile device 200. In particular, the mobile device is tapped on a door (step 302) and the lock detects the tapping operation (step 304). The mobile device 200 and electronic lock 100 each store tapping information (steps 306, 308). The mobile device 200, in this embodiment, initializes an authorized connection (step 310) by attempting to connect to the electronic lock 100. If a connection is available (step 322) the lock accepts an authorized connection (step 312). If no connection is available, the electronic lock may instead halt the entire process, since the electronic lock 100 has no way of determining that the mobile device 200 is in proximity. Otherwise stated, when no connection is available, the electronic lock 100 does not authorize entry since the mobile device is not in proximity, and therefore no knock according to the features of the present application could have taken place for purposes of verification.

By way of comparison to FIG. 7A, the mobile device sends its tapping information to the electronic lock (step 352), and the electronic lock performs processing of the tapping information (step 354) from both the lock 100 and mobile device. The electronic lock 100 then performs a comparison of the features in the processed tapping information (step 356) and performs a similarity correlation (step 358), as noted in FIG. 8. If there is no similarity, at operation 324, connection is denied, and the devices disconnect at step 350, returning to an idle state 360. If similarity is determined, operation continues as discussed above with respect to FIG. 7A.

Referring to FIGS. 7A-7B specifically, it is noted that the embodiment shown in FIG. 7A may be advantageously used in circumstances where a mobile device such as a mobile phone is used in connection with an electronic lock; in such circumstances, the additional processing required to be performed in comparing gesture processing can be performed at the mobile device, thereby reducing power requirements of the electronic lock. However, the arrangement of FIG. 7B may be used as well in such circumstances. The embodiment of FIG. 7B may also be used in cases where the mobile device is, instead of a mobile phone, an electronic key fob or other low-power device which may have comparatively less processing capabilities than the electronic lock itself.

FIG. 8 is a flowchart of a method 400 of comparing gesture processing signals via a mobile device, according to an example embodiment. The method 400 occurs in response to sensing a tap event (at 420) either at the mobile device 200 or electronic lock 100, as noted above with respect to FIGS. 7A-7B. In the embodiment shown, if no connection is available between a mobile device and electronic lock, it is assumed that no unlocking operation can occur, and the comparison event is rejected (step 406).

In the embodiment shown, if a connection is available between the mobile device and electronic lock (at step 404), signal strength is assessed (at step 408) and time is synchronized between devices (at step 410). A time window comparison is performed (at step 412) to determine whether a timestamp between synchronized tap events on the mobile device and the electronic lock are correlated. A tap interval comparison (at step 414) is also performed, for example to determine if the mobile device and electronic lock have detected tapping events at a same frequency/cadence.

In the embodiment shown, a number of taps comparison (at step 416) further determines if the number of taps at each device is also the same or similar, and a magnitude assessment (at step 418) determines relative magnitude of taps. It is noted that in the magnitude assessment, the relative magnitudes of tapping events relative to other tapping events on the same device are assessed (e.g., a first tap is of greater magnitude than a second tap on both devices, etc.).

Still further, the magnitude assessment can be performed along various force vectors; accordingly, the electronic lock can determine a direction from which a tapping action is performed (e.g., from an outside or an inside of the door on which the lock is installed), as well as an angle at which the gesture was received at the door. This information can be used both to determine whether the tapping gesture should be approved to validate the user (e.g., in the case of authentication, that the tapping operation occurs from outside of the door) as well as provide additional information usable for validation. In still further examples, the direction of tapping can be used for additional contextual information provided to the electronic lock 100. For example, a knocking operation that is determined to have been initiated form inside the door, the lock may be configured to lock the door in a predetermined amount of time (e.g., 10 seconds).

In addition, to validate that the two devices are detecting analogous tapping events, a force vector is assessed (step 420) to determine that a vector of tapping indicates that the tapping occurs on an outside of the door. A weighted formula is then applied to each of the assessments (e.g., the assessments of steps 412-420) to determine if there is adequate correlation between the tapping detected on the mobile device and the electronic lock. Based on the weighted formula determining that the tapping event adequately corresponds across the electronic lock and mobile device, an unlocking operation is performed or allowed (step 424).

Referring to FIG. 8 generally, it is noted that in some embodiments, fewer than all of the assessments of steps 412-420 may be used to determine correlation among gestures detected by the mobile device and the electronic lock; in some embodiments, as few as one such comparison may be performed. However, increased numbers of operations can be used to more closely correlate gestures detected by the electronic lock and the mobile device. Still further, depending on the mounting arrangement of the electronic lock, in some instances different assessments may provide more or less accurate results, and calibration/training may be performed to assign a particular weighting to the assessments to optimize the processing and ensure accuracy, minimizing false negative results while avoiding false positive processing results.

Still further, although the validation between the mobile device and the electronic lock in FIGS. 7A-7B and FIG. 8 can be performed to determine whether to actuate the electronic lock, in alternative embodiments, one or more other types of actions may be taken in response to the validation between the electronic lock and mobile device. For example, in one application, the mobile application and electronic lock may use a gesture-based validation to exchange encryption key information, or to pair the mobile device with the electronic lock. This may be particularly advantageous to avoid the possibility of a man in the middle attack during exchange of encryption keys. Still further, with respect to the pairing process, in some instances, a direction of a force vector detected at the mobile device can be used to determine whether a gesture is acceptable from either an authentication, a pairing, or a key exchange perspective. For example, a gesture causing a force vector detected by the electronic lock indicative of a force coming from inside a premises may be useable for pairing, but not for authentication and lock actuation, while a force vector indicating a gesture from outside of a door may be useable for authentication and actuation of the electronic lock.

Referring to FIGS. 1-8 overall, it is noted that the present disclosure reflects a number of advantages. For example, this provides a more intuitive and user-friendly way to lock and unlock a door itself by uniquely identifying a user's intent to unlock or lock the door. Still further, this methodology enhances security by ensuring that it is a previously authenticated device that is uniquely being used to attempt actuation of the lock (i.e., that the user holding that device intends to actuate the lock).

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A wireless electronic lockset comprising:
  a processing unit;
  a locking bolt movable between locked and unlocked positions;

a motor actuatable by the processing unit to move the locking bolt between the locked and unlocked positions, a motion sensor communicatively connected to the processing unit and configured to detect physical motion of the wireless electronic lockset;

a wireless interface communicatively connected to the processing unit;

wherein the processing unit is configured to execute instructions to perform:

receiving, from the motion sensor, first motion signals;

receiving, from a mobile device, second motion signals; and based on a similarity correlation of the first motion signals to the second motion signals captured by the mobile device, actuating the motor to move the locking bolt between the locked and unlocked positions.

2. The wireless electronic lockset of claim 1, wherein the processing unit is further configured to:

transmit motion information to the mobile device based on the first motion signals; and receive a lock actuation command from the mobile device in response to the mobile device performing the similarity correlation based on the motion information.

3. The wireless electronic lockset of claim 1, wherein the processing unit is further configured to:

perform the similarity correlation at the processing unit, wherein the similarity correlation comprises:

evaluating a relative signal strength of the first motion signals and the second motion signals;

synchronizing timing of the first motion signals and the second motion signals;

performing one or more comparisons selected from:

(a) a first time window in which the first motion signals were captured to a second time window in which the second motion signals were captured;

(b) a first interval between consecutive motion signal events in the first motion signals to a second interval between consecutive motion signal events in the second motion signals; or (c) a first force magnitude of a first peak motion signal event in the first motion signals to a second force magnitude of a second peak motion signal event in the second motion signals; and validating a direction of force represented by the first motion signals on the wireless electronic lockset to detect a direction from which a force is received.

4. The wireless electronic lockset of claim 3, wherein performing one or more of the comparisons (a)-(c) comprises performing each of the comparisons (a)-(c).

5. The wireless electronic lockset of claim 4, further comprising performing a weighting formula to each of the comparisons (a)-(c) to assess the similarity correlation.

6. The wireless electronic lockset of claim 1, wherein the first motion signals and second motion signals are generated based on a tapping action performed by a user tapping the mobile device against a door to which the wireless electronic lockset is mounted.

7. The wireless electronic lockset of claim 1, wherein the wireless interface comprises a Bluetooth communication interface.

8. The wireless electronic lockset of claim 1, further comprising a battery electrically connected to the processing unit and the motor.

9. A method of actuating a wireless electronic lockset, the method comprising:

receiving first motion signals representative of physical motion of a wireless electronic lockset at an application installed in a mobile device;

obtaining, at the application installed in the mobile device, second motion signals representative of physical motion of the mobile device detected by a motion sensor of the mobile device;

performing a similarity correlation between the first motion signals and the second motion signals; and based on the similarity correlation determining that the first motion signals and second motion signals are correlated and authentication of the mobile device at the wireless electronic lockset, transmitting an actuation command from the application installed in the mobile device to the wireless electronic lockset.

10. The method of claim 9, further comprising, at the wireless electronic lockset, actuating a motor to move a locking bolt between locked and unlocked positions in response to the actuation command.

11. The method of claim 9, further comprising establishing a secure connection to the wireless electronic lockset prior to receiving the first motion signals.

12. The method of claim 9, wherein the similarity correlation comprises:

evaluating a relative signal strength of the first motion signals and the second motion signals;

synchronizing timing of the first motion signals and the second motion signals;

performing one or more comparisons selected from:

(a) a first time window in which the first motion signals were captured to a second time window in which the second motion signals were captured;

(b) a first interval between consecutive motion signal events in the first motion signals to a second interval between consecutive motion signal events in the second motion signals; and (c) a first force magnitude of a first peak motion signal event in the first motion signals to a second force magnitude of a second peak motion signal event in the second motion signals; and validating a direction of force represented by the first motion signals on the wireless electronic lockset to detect a direction from which a force is received.

13. The method of claim 9, further comprising, after transmitting the actuation command, updating a status of the wireless electronic lockset stored via the application at the mobile device.

14. The method of claim 13, further comprising, after updating the status of the wireless electronic lockset, disconnecting the mobile device from the wireless electronic lockset.

15. The method of claim 9, wherein the actuation command comprises an unlocking command causing the wireless electronic lockset to actuate a locking bolt between locked and unlocked positions.

16. A system for actuating a wireless electronic lockset, the system comprising:

a wireless electronic lockset;

an application installable on a mobile device which, when executed, causes the mobile device to perform:

capturing, from a motion sensor of the mobile device, first motion signals; and establishing a secure connection to the wireless electronic lockset;

wherein the wireless electronic lockset includes a motion sensor and a wireless interface each communicatively connected to a processing unit, the wireless electronic lockset further including a locking bolt movable between locked and unlocked positions and a motor actuatable by the processing unit to move the locking bolt between the locked and unlocked positions, the processing unit executing instructions to perform:
receiving, from the mobile device, the first motion signals;
receiving, from the motion sensor, second motion signals; and
based on a similarity correlation of the second motion signals to the first motion signals captured by the mobile device, actuating the motor to move the locking bolt between the locked and unlocked positions.

17. The system of claim 16, wherein the first motion signals represent motion of the mobile device and the second motion signals represent physical motion of the wireless electronic lockset.

18. The system of claim 16, wherein the similarity correlation is performed by one or more of the mobile device, the wireless electronic lockset, and a cloud-based service communicatively accessible via the application.

19. The system of claim 16, wherein the similarity correlation comprises:

evaluating a relative signal strength of the first motion signals and the second motion signals;
synchronizing timing of the first motion signals and the second motion signals;
comparing a first time window in which the first motion signals were captured to a second time window in which the second motion signals were captured;
comparing a first interval between consecutive motion signal events in the first motion signals to a second interval between consecutive motion signal events in the second motion signals;
comparing a first force magnitude of a first peak motion signal event in the first motion signals to a second force magnitude of a second peak motion signal event in the second motion signals; and
validating a direction of force represented by the first motion signals on the wireless electronic lockset to detect a direction from which a force is received.

20. The system of claim 16, wherein the mobile device comprises at least one of a cellular telephone, an Internet of Things device, a fob, or a smartwatch.

* * * * *